W. O. RENKIN.
APPARATUS FOR AUTOMATICALLY CONTROLLING FLOWING MATERIALS.
APPLICATION FILED DEC. 17, 1918.
1,329,018.
Patented Jan. 27, 1920.
3 SHEETS—SHEET 2.
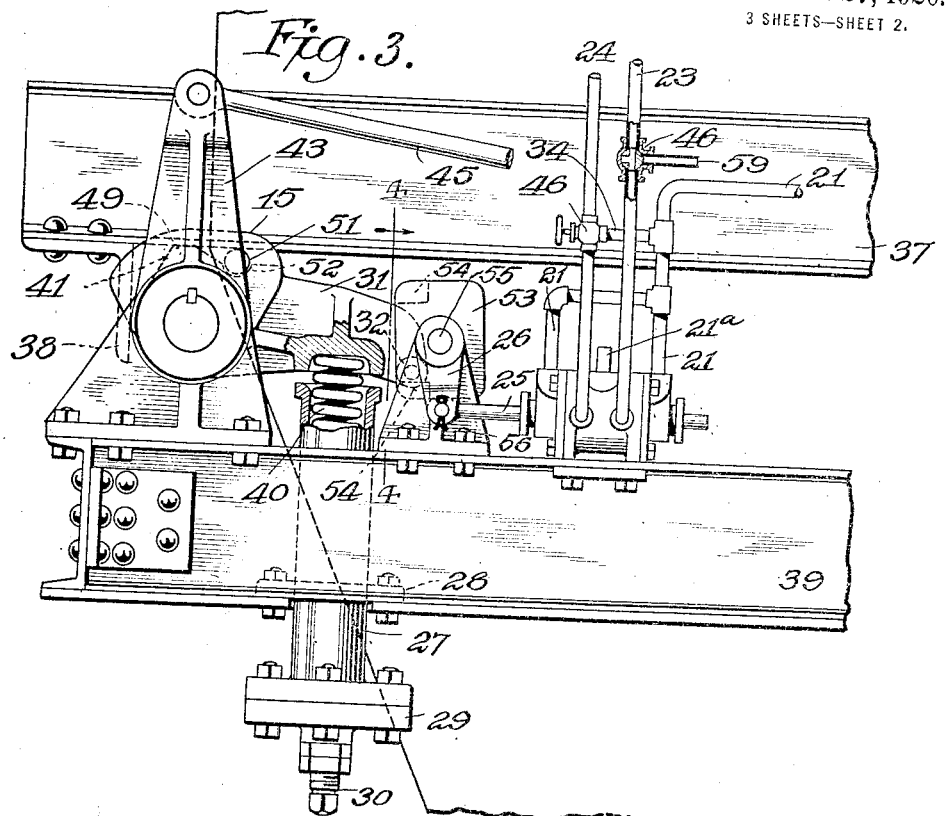
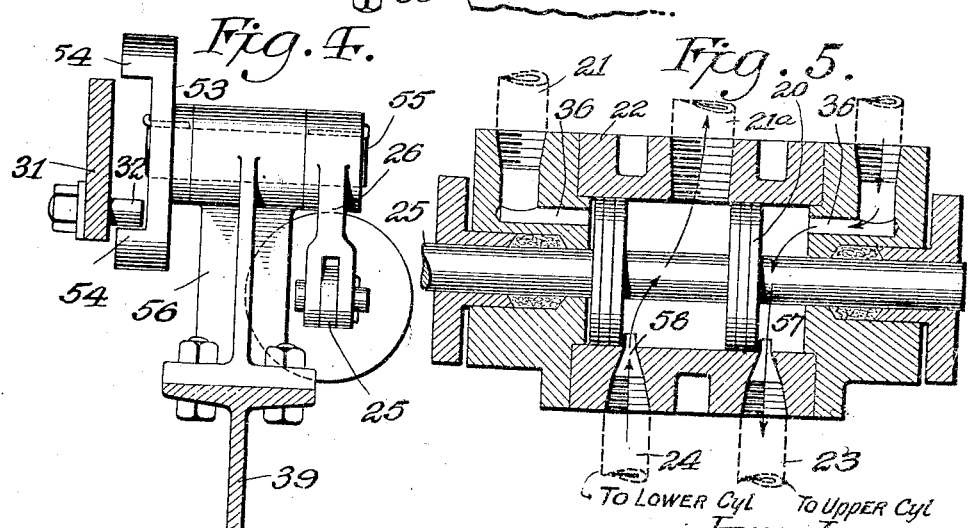

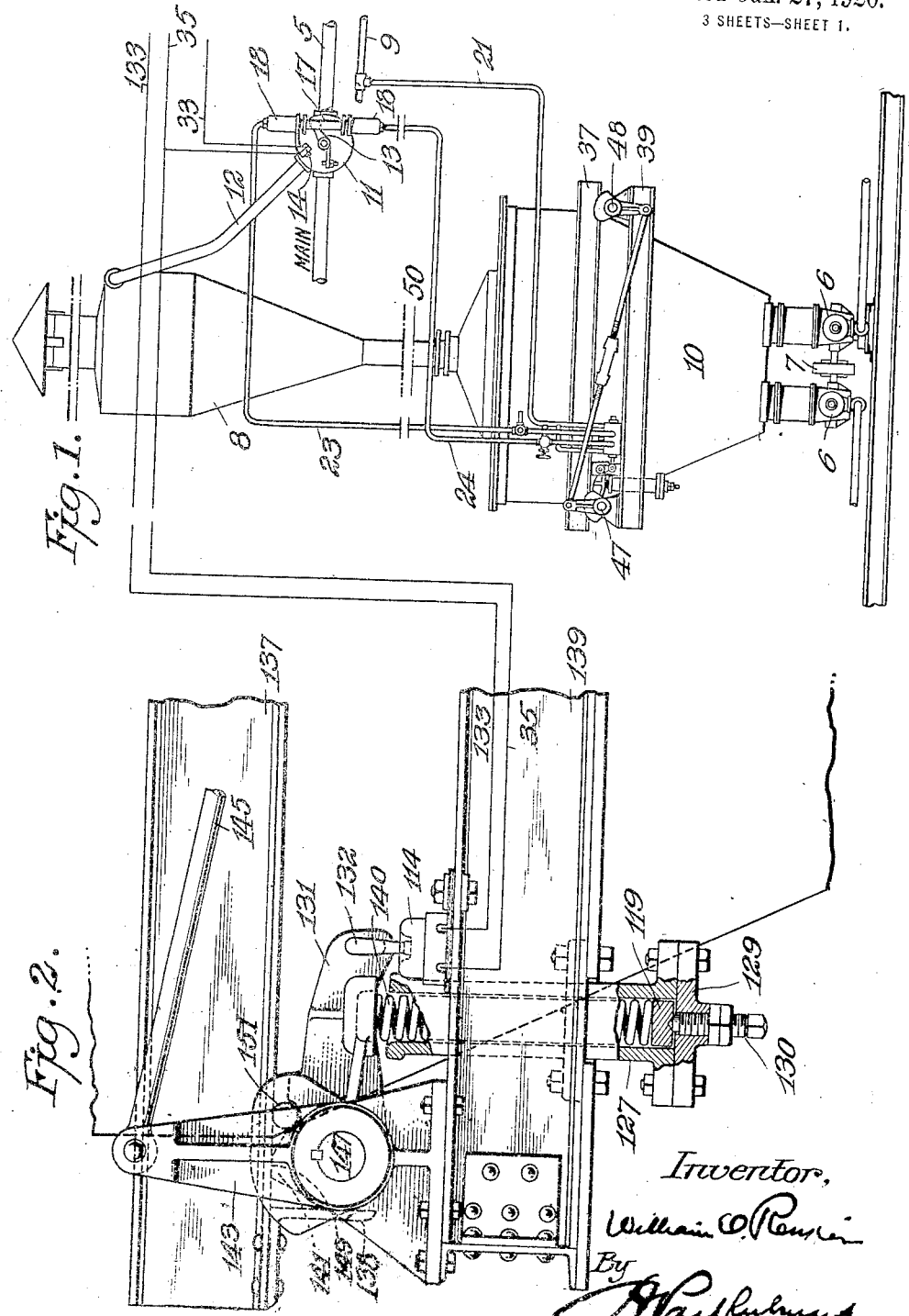

W. O. RENKIN.
APPARATUS FOR AUTOMATICALLY CONTROLLING FLOWING MATERIALS.
APPLICATION FILED DEC. 17, 1918.
1,329,018.
Patented Jan. 27, 1920
3 SHEETS—SHEET 3.
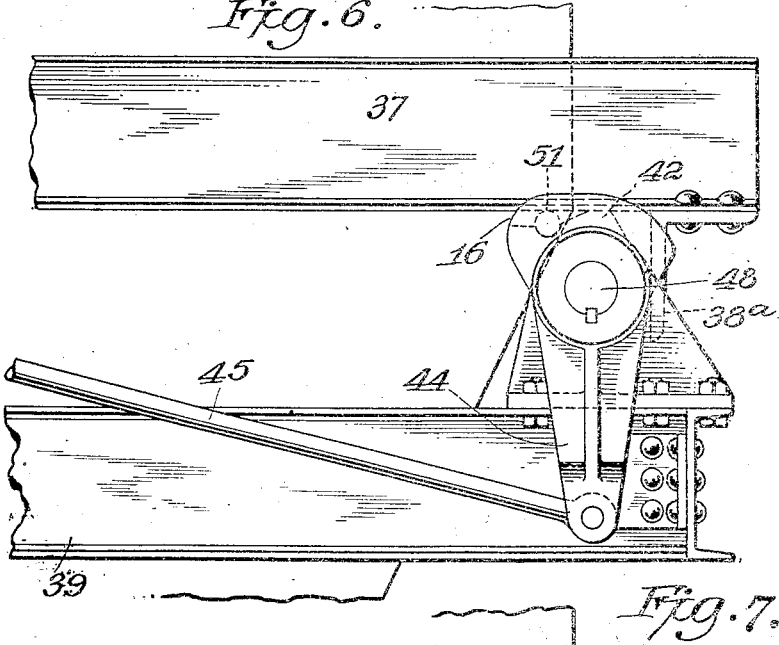
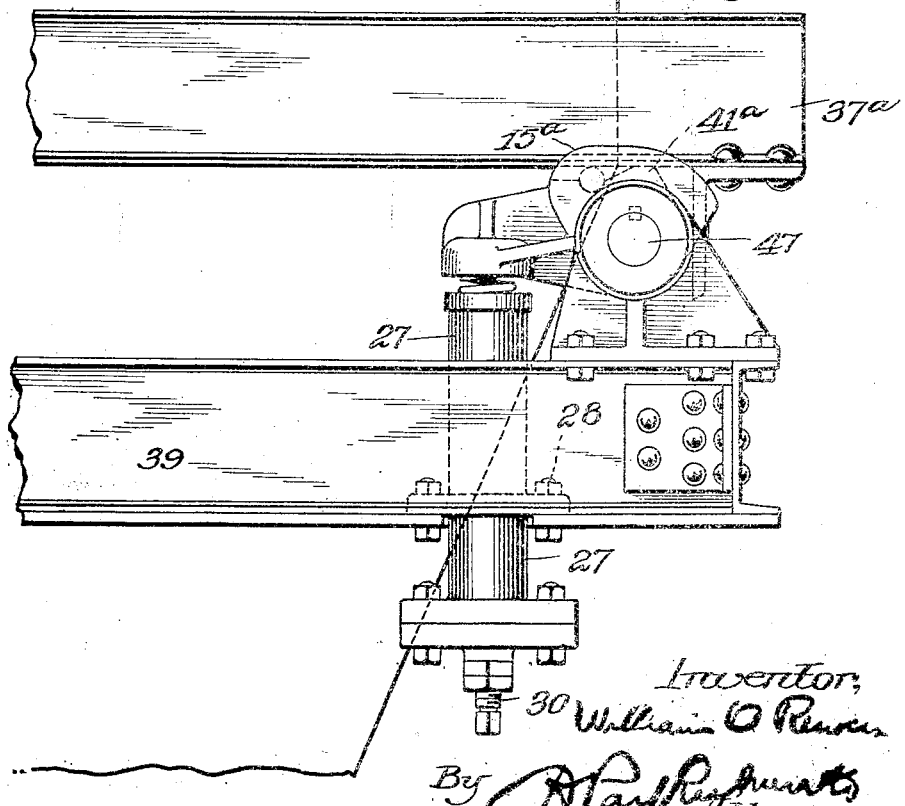

UNITED STATES PATENT OFFICE.

WILLIAM O. RENKIN, OF ORADELL, NEW JERSEY, ASSIGNOR TO QUIGLEY FURNACE SPECIALTIES CO., INC., A CORPORATION OF NEW YORK.

APPARATUS FOR AUTOMATICALLY CONTROLLING FLOWING MATERIALS.

1,329,018.   Specification of Letters Patent.   Patented Jan. 27, 1920.

Application filed December 17, 1918. Serial No. 267,114.

*To all whom it may concern:*

Be it known that I, WILLIAM O. RENKIN, a citizen of the United States of America, residing at Oradell, county of Bergen, State of New Jersey, have invented certain new and useful Improvements in Apparatus for Automatically Controlling Flowing Materials, of which the following is a specification.

My invention relates to the automatic supply of materials to various portions of a system for delivering flowing materials to various points. Its particular usefulness occurs in a general system for automatically controlling the flow of finely divided materials such as pulverized coal by means of compressed air to local bins to supply a plurality of furnaces such as is shown and described in my U. S. Patent No. 1,301,168, granted April 22, 1919, and comprises certain improvements in details of apparatus therein generally disclosed. The best form of apparatus at present known to me embodying my invention is illustrated in the accompanying three sheets of drawings in which, Figure 1 is a side elevation with parts broken away of a local or branch bin and connections for supplying powdered coal thereto on a current of compressed air.

Fig. 2 is a detail elevation and partial section upon an enlarged scale of part of the supporting mechanism of the end bin of the system.

Fig. 3 is a similar view of the corresponding portion of one of the other bins such as is shown in Fig. 1.

Fig. 4 is a detail cross section on an enlarged scale on line 4—4 of Fig. 3.

Fig. 5 is a longitudinal section on an enlarged scale of the reversing valve.

Fig. 6 is an enlarged detail of the right hand supporting cam shown in Fig. 1, connecting parts being broken away, and Fig. 7 is a similar view of the rear cam on the lefthand side of the bin shown in Fig. 1.

Throughout the drawings like reference characters indicate like parts. 5, is the main line conduit through which slugs of powdered coal are forced by a current of compressed air in the manner described in my previously mentioned patent. 12, is a branch conduit extending to the cyclone separator 8, supported above the local bin 10, which is one of several to be supplied with powdered coal through the conduit 5. Below the bin and supported therefrom are controllers 6, 6, driven by any suitable motive device represented at 7, to feed the coal to an adjacent furnace, not shown.

The bin 10, is hung from sills 37, 37ª, resting on cams 41, 42, 41ª, &c., mounted on shafts 47, 48, journaled on the foundation or supporting frame represented at 39. 11, represents a switch valve or other means for alternately opening the branch connection 12, and closing the conduit 5, beyond the branch point, or closing said branch 12, and opening the conduit through to the more distant portions of the system.

As in the construction shown in my before mentioned pending application, this valve 11, may be equipped with an arm, as 13, adapted to coöperate with a circuit making and breaking device 14, in the electric circuit 33, 35, through which a telltale device may be operated at the sending station so that the operator at said station is notified of changes in position of the valve, while the other end of this lever engages the trunk piston 17, reciprocating between the opposed compressed air cylinders 18, 18, to which compressed air or other fluid under pressure is supplied through pipes 23, 24, to shift the piston and valve from one position to another.

Compressed air is supplied through the main 9, to the branch pipe 21, serving this particular local bin. The separator 8, being rigidly supported, the vertical movable bin 10, must have some kind of a slip connection therewith, as indicated at 50.

Each of the cams, as 41, (see Fig. 3) has a flat surface 49, on which the sill of the bin may have a broad bearing when the bin is in its lowermost position, while friction between the cam and the sill during movement of the parts is reduced by means of the friction roller 51, resting in the semicircular bearing 52, formed in the cam, and forced up against the under surface of the sill 37, or 37ª, as soon as the cam begins to swing upward. Any suitable means may be employed for lubricating this roller and for preventing it from slipping endwise out of its proper position.

Each one of the front cams, as 41, 42, has a flange 15, or 16, which engages the outer front edge of the sill 37, while each one of the rear cams, as 41ª, has a flange, as 15ª, engaging the outer back surface of the rear sill 37ª, so that any sliding motion of the bin forward or backward is prevented by said flanges. At the outer lefthand end of each of the sills, as 37, is a projection, as 38, which has a vertical face at right angles to the faces of the cam flanges and so placed as to bear against the cylindrical portion of its adjacent cam, as 41. Similarly, each one of the right hand ends of these sills has a corresponding projection, as 38ª, extending downward from the bin sill in contact with the cylindrical portion of the adjacent cam, as 42. These vertically extending projections 38, 38ª, prevent sidewise motion of the bin and coöperate with the flanges 15, 16, &c., to compel the bin to rise and fall in a vertical line.

Certain of the cams have arms, as 31, provided with sockets in their under sides against which rests the upper end of the stiff spiral compression springs 40, each of which is mounted in a barrel 27, bolted to the frame beam 39, through the agency of flanges 28. 29, is a bottom piece or closure for the barrel 27, in which is mounted an adjusting screw 30, on which rests a block supporting the lower end of spring 40. The character of this construction is shown in Fig. 2, where such a block 119, is shown supported by its corresponding adjusting screw 130, mounted in the casting 129, bolted to the bottom of spring barrel 127. The cams also have projecting arms 43, 44, which are connected together by a connecting rod 45, so that all the cams must move in unison, although the right hand cams, as 42, are not directly supported by any springs.

To control the operation of the fluid pressure motor 17—18, I prefer to employ a special form of double piston valve 20, provided with cylindrical casing 22. The piston rod 25, of this valve is connected to rocker arm 26, on rocker shaft 55, which is journaled in housing 56, and carries at its other end rocking block 53. This rocking block carries laterally projecting lugs 54, 54, with which pin 32, on cam arm 31, coöperates. The pipe 23, to the upper cylinder 18, is connected to side port 57, near the outer end of valve casing 22, and pipe 24, to the lower cylinder is connected to similar port 58, near the inner end of valve casing 22. Compressed air pipe 21, is branched and connected to either end of the valve casing, where terminal passages 36, 36, in the casing heads discharge the jets of entering air axially of the valve against the outer faces of the valve pistons. The valve exhaust is through passage 21ª, from the middle of the casing between the valve pistons. Statically the valve is always substantially balanced, the pressure from supply branch 21, acting equally on the two outer faces of the valve pistons, and whatever exhaust pressure there is acting equally on their inner faces. It is evident, however, that the dynamic effect of the jet of incoming air from either inlet terminal 36, which will form as soon as one of the adjacent outlet ports, as 57, is uncovered to allow air to pass to one of the cylinders 18, will be unopposed by any counter jet, as the other inlet terminal is then dead and the exhaust from the other cylinder 18, enters the valve through port 58, radially and escapes radially through exhaust port 21ª, and so does not impinge on either valve piston. As a result of the design and proportion of parts shown in the drawings, when the rocking block 53, is swung in a clockwise direction, and gradually pulls valve 20, to the left, it first simultaneously closes and later simultaneously opens both discharge ports 57, 58, reversing their respective connections to supply and exhaust ports. The moment port 57, is opened, the jet of air from the adjacent terminal 36, formed by the rush of air through the valve and out through port 57, and pipe 23, to the empty upper cylinder 18, will strike the outer surface of the valve piston and drive the valve to the extreme lefthand position shown in Fig. 5, thus opening ports 57, 58, to their new connections to their full width instantly. This insures a prompt reversal of valve 11, and prevents any wire-drawing of the fuel and air through a partly closed or partly opened valve 11, into branch conduit 12, or further sections of line conduit 5, such as would occur if valve 11, were left in a half-way position or swung slowly from one position to the other. When a reverse clockwise movement of rocking block 53, occurs, a reverse action of valve 20, results, throwing it into the extreme right hand position indicated in Figs. 1 and 3.

46, 46, are three-way hand-operated valves in pipes 23, 24, the one in pipe 23, having an exhaust discharge opening 59, and the one in 24 having a by-pass connection 34, to supply pipe 21. By operating these valves 20 can be cut out, or by-passed, and full pressure applied to lower cylinder 18, while the air in upper cylinder 18, is exhausted, no matter what the position of valve 20.

The end bin of the series has no valve connections or equipment as it needs only an open connection to line conduit 5. A detail of its mounting on sills 137, showing one cam 141, journaled on main frame 139, etc., appears in Fig. 2, parts being numbered correspondingly to those of bin 10, but in the "hundred" series. The cam arm 131, carries a gooseneck projection 132, in place of the pin 32, carried by cam arm 31. This projection 132, coöperates with circuit controller 114. This latter is of a standard, push-button type which opens the circuit 133—35 when the button is pressed down by gooseneck 132. Circuit controller 14, is of similar standard type, but closes circuit 33—35 when pressed in by arm 13.

The general operation of the apparatus is the same as of that described in my patent above referred to. So long as any one of the tell tale lamps (not shown) of any of the bins 10, is glowing the operator of the sending station knows that such bin is either emptied down to the predetermined allowable limit and awaiting refilling, or is being filled, and that he may safely continue sending coal through line conduit 5. If the lights of all bins 10, go out, but that of the end bin still glows, the operator knows that bin is not filled and that he can still continue sending out coal but must prepare to shut down soon. When all telltale lamps have been extinguished, however, he knows that all the bins have been filled, and that he must shut down his sending apparatus until some of the lamps glow again.

The rocking block 53, and cam arm 31, carrying pin 32, coöperating with rocking block lugs 54, 54, form a lost motion connection between bin 10, and the valve 20, controlling the motor which operates valve 11, by which said valves are reversed only when the moving bin nearly reaches the limit of its up or down motion and are then left in their new positions until the bin has nearly completed its movement in the opposite direction. During the very last fraction of bin travel up or down, valve 20, is slowly pulled toward its central position, from which it is quickly snapped over to its full reversed position by air impact as above described.

If the furnace fed by any bin, as 10, supplied by a branch from the line conduit, goes out of action while the bin is waiting to be filled, or is being filled (which means that its valve 11 is then in position to open branch 12, and close communication with more distant bins), or if the bin needs immediate repairs and for these, or any other, reasons it is desired to cut out that bin from the general system, its valve 20 can be by-passed by turning the three-way valves 46, in pipes 23 and 24, in a clockwise direction 90 degrees from the position of the valve shown in section in Fig. 3. This will open the by-pass connection 34, from pipe 21 to pipe 24, and close connections from port 58, open the exhaust 59, to the upper portion of pipe 23, and close off the lower portion from port 57. As a result the switch valve 11, will be thrown into line position and held there independent of valve 20, so that the rest of the system can be operated as though there were no valve 11, and automatic means for operating it. When the automatic action is to be resumed, valves 46, will be turned back into the position shown in Fig. 3, which opens pipes 23, 24 to valve 20.

The advantages of my present invention comprise the simplified and standardized details of construction, the introduction of the anti-friction bearings for the cam surfaces, the positive connection to the reversing valve (all springs being eliminated therefrom) the means for cutting out the automatic apparatus, etc.

Having described my invention, I claim:

1. The combination, with a plurality of vertically movable spring supported containers, a conduit for supplying flowing materials to said containers, branches from said conduit to the various containers and means for alternately opening the branch to one container, closing the conduit beyond the branch, or closing the branch and opening the conduit, of a fluid pressure motor for operating said conduit and branch controlling means, a valve, operated by the rise or fall of the container, directing the flow of fluid under pressure to said conduit and branch controlling means, and manually operated devices for modifying the pressure of said fluid on said means independently of the container's movement or position.

2. The combination, with a vertically movable, yieldingly supported container, a line conduit for the transportation of flowing materials, a branch from said conduit to said container, and mechanism adapted to open the branch and close the conduit beyond the junction point, or to close the branch and open the conduit, of a reciprocating fluid pressure motor connected to said last mentioned mechanism, a valve operated by the rise or fall of the container, connections for supplying fluid under pressure to said valve, a pipe connected to one delivery port of said valve and supplying fluid therefrom to operate the motor to open the branch and close the line, another pipe connected to another delivery port of the valve and supplying fluid therefrom to operate the motor to close the branch and open the line, independent means for supplying fluid pressure direct to the last mentioned pipe, and independent means for venting the first mentioned pipe.

3. A combination such as set forth in claim 2 in which the independent means for charging and venting the respective fluid supplying pipes are also adapted to simultaneously close connections to the valve which is operated by the rise and fall of the container.

4. The combination with a vertically-movable, spring-supported container, a conduit for supplying flowing materials to said container, means controlling passage through said conduit, a fluid pressure motor for operating said means, pipes for conveying a supply of fluid under pressure to said motor, a reversing valve for controlling the flow of fluid through said pipes and a lost motion connection from the movable container to the said valve which valve comprises a casing having ports in both heads to which the pressure-liquid supplying pipe is connected, an exhaust port in its side substantially midway of its length and two delivery ports in its side equally spaced from the adjacent casing heads connected to either end of the fluid motor, and a double-piston adapted to be reciprocated in the casing by the lost motion connection from the movable container, each said piston being of a thickness less than the distance from the outer edge of each delivery port to the adjacent casing head and so placed that the delivery ports are opened simultaneously by motion in either direction of the double piston, while the space between the piston heads is always open to the exhaust port, whereby upon partial movement of the double-piston by the lost motion connection in either direction until one delivery port has been closed off from one inlet port and the other delivery port partly opened to its corresponding inlet port, the dynamic force of the rush of air from said last mentioned inlet port will at once drive the double-piston to the limit of its stroke in that direction, completing the opening of the delivery ports to inlet and exhaust spaces and taking up the slack of the lost motion connection.

WILLIAM O. RENKIN.